US012456799B2

(12) United States Patent
Yeh et al.

(10) Patent No.: US 12,456,799 B2
(45) Date of Patent: Oct. 28, 2025

(54) METHOD AND APPARATUS FOR USING SLAP BRACELET AS COMPONENT OF BODY-WORN ANTENNA STRUCTURE

(71) Applicant: UNIVERSAL CITY STUDIOS LLC, Universal City, CA (US)

(72) Inventors: Wei Cheng Yeh, Orlando, FL (US); Rachel Elise Rodgers, Orlando, FL (US); Jason Arthur Gill, Pittsburgh, PA (US); Sam James Deane, Pittsburgh, PA (US); Eric James Biel, Glenshaw, PA (US); Charles Edward Greene, Butler, PA (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/411,014

(22) Filed: Aug. 24, 2021

(65) Prior Publication Data

US 2022/0069448 A1 Mar. 3, 2022

Related U.S. Application Data

(60) Provisional application No. 63/071,226, filed on Aug. 27, 2020.

(51) Int. Cl.
*H01Q 1/27* (2006.01)
*H01Q 1/24* (2006.01)
*H01Q 1/44* (2006.01)

(52) U.S. Cl.
CPC ............. *H01Q 1/273* (2013.01); *H01Q 1/245* (2013.01); *H01Q 1/44* (2013.01)

(58) Field of Classification Search
CPC .......... H01Q 1/273; H01Q 1/245; H01Q 3/44; H01Q 3/446; H01Q 1/44
See application file for complete search history.

(56) References Cited

U.S. PATENT DOCUMENTS 4,884,252 A 11/1989 Teodoridis et al.
5,883,576 A 3/1999 De La Huerga
(Continued)

FOREIGN PATENT DOCUMENTS

EP 0288676 A2 11/1988
JP 2019066401 A 4/2019
(Continued)

OTHER PUBLICATIONS

Niu et al.; An Overview on Backscatter Communications; Journal of Communications and Information Networks, vol. 4, No. 2, Jun. 2019 (Year: 2019).*
(Continued)

*Primary Examiner* — Ab Salam Alkassim, Jr.
(74) *Attorney, Agent, or Firm* — Fletcher Yoder, P.C.

(57) ABSTRACT

Aspects of the disclosure relate to methods, apparatus, and systems for mitigating signal attenuation at a body-worn device transmitting a radio signal. An antenna structure for the body-worn device includes an antenna array configured to radiate at least one radio signal and a conductive band capacitively coupled to the antenna array. The conductive band is configured to detachably couple to a body of a user, and mitigate attenuation of the at least one radio signal when the conductive band is coupled to the body. The conductive band mitigates the attenuation by facilitating a radio frequency (RF) signal current corresponding to the at least one radio signal to flow through the conductive band and preventing absorption of the RF signal current by the body.

17 Claims, 12 Drawing Sheets

(56) References Cited

U.S. PATENT DOCUMENTS

| | | | | |
|---|---|---|---|---|
| 5,886,669 | A * | 3/1999 | Kita | H01Q 1/273 343/718 |
| 7,113,137 | B2 | 9/2006 | Bisig | |
| 7,126,550 | B2 | 10/2006 | Clerc et al. | |
| 7,162,217 | B2 | 1/2007 | Bisig | |
| 9,477,922 | B2 | 10/2016 | Krishna et al. | |
| 10,312,575 | B2 * | 6/2019 | Kim | H01Q 9/42 |
| 2001/0010662 | A1 * | 8/2001 | Saitou | H01Q 7/00 368/281 |
| 2002/0105471 | A1 * | 8/2002 | Kojima | H01Q 3/446 343/754 |
| 2002/0158798 | A1 * | 10/2002 | Chiang | H01Q 9/32 342/372 |
| 2003/0155389 | A1 * | 8/2003 | Swartzentruber | A44C 5/12 224/164 |
| 2003/0169207 | A1 * | 9/2003 | Beigel | H01Q 1/2225 343/718 |
| 2004/0027304 | A1 * | 2/2004 | Chiang | H01Q 3/446 343/810 |
| 2004/0222930 | A1 | 11/2004 | Sun et al. | |
| 2012/0026009 | A1 * | 2/2012 | Zhao | H04Q 9/00 340/870.28 |
| 2013/0241795 | A1 | 9/2013 | Sung et al. | |
| 2014/0375465 | A1 | 12/2014 | Fenucco et al. | |
| 2015/0255860 | A1 * | 9/2015 | Lienau | H01Q 1/273 343/702 |
| 2015/0333302 | A1 * | 11/2015 | Johns | G04C 10/00 429/127 |
| 2016/0190678 | A1 * | 6/2016 | Hong | H01Q 1/44 343/700 MS |
| 2016/0275322 | A1 * | 9/2016 | Carrender | H01Q 9/26 |
| 2019/0180588 | A1 * | 6/2019 | Lerner | G06K 7/10366 |
| 2019/0190130 | A1 * | 6/2019 | Jouanlanne | H01Q 7/00 |
| 2019/0196414 | A1 | 6/2019 | Eshima et al. | |
| 2020/0138304 | A1 * | 5/2020 | Ozawa | A61B 5/1495 |
| 2020/0186179 | A1 * | 6/2020 | Horiuchi | H01Q 9/42 |
| 2020/0220576 | A1 * | 7/2020 | Richter | H04B 5/0012 |
| 2022/0393352 | A1 * | 12/2022 | Oh | H01Q 5/35 |

FOREIGN PATENT DOCUMENTS

| | | | | |
|---|---|---|---|---|
| KR | 20160025406 | A * | 3/2016 | |
| WO | 2001091229 | A1 | 11/2001 | |
| WO | WO-0191229 | A1 * | 11/2001 | G04G 21/04 |
| WO | WO-2015029610 | A1 * | 3/2015 | G04G 21/04 |

OTHER PUBLICATIONS

International Search Report and Written Opinion, PCT/2021/047515, Nov. 30, 2021, 8 pgs.

EP Extended European Search Report (EESR) for European Application No. 21862639.8 mailed Sep. 13, 2024.

JP Office Action for Japanese Application No. 2023-513580 mailed Jun. 9, 2025.

"New Antenna 'Amcenna®' Maintains Its Characteristics Even When Installed near Water or Metal, Accelerating the Spread of IoT." Nov. 8, 2019, Kyocera Corporation, www.kyocera.co.jp/rd-openinnovation/catalog/amcenna.html.

* cited by examiner

900

| Name | Freq | Ang | Mag | RX |
|---|---|---|---|---|
| m1 | 0.9150 | 52.6729 | 0.0864 | 1.0995 + 0.1522i |

1000

METHOD AND APPARATUS FOR USING SLAP BRACELET AS COMPONENT OF BODY-WORN ANTENNA STRUCTURE

CROSS-REFERENCE TO RELATED APPLICATION

This application claims priority to and the benefit of U.S. Provisional Application Ser. No. 63/071,226 entitled "METHOD AND APPARATUS FOR USING SLAP BRACELET AS COMPONENT OF BODY-WORN ANTENNA STRUCTURE" filed on Aug. 27, 2020, the entire contents of which is incorporated herein by reference as if fully set forth below in its entirety and for all applicable purposes.

TECHNICAL FIELD

The technology discussed below relates generally to antennas, and more particularly, to body-worn antenna structures.

INTRODUCTION

Advancements in wearable technologies have made it possible to expand the scope and extent of communications capabilities. For example, wrist or body-worn devices are in wide use for purposes of communication. Such devices may be used to track or identify an object or person in a space or to transmit or receive relevant data. However, the close proximity of a wearable device's antenna to a human body makes it difficult to provide efficient and/or effective radiation.

Recent trends have dictated that wearable devices be made as small as possible. For example, combining the small size of a wrist or body-worn device with the increasing demand for better performance presents a number of challenges. Antennas and impedance matching associated with a wearable device must be able to discriminate between a number of signals to obtain a particular signal of interest or to increase the sensitivity/range of the device. An antenna also needs to be an efficient radiator. However, if a device is manufactured in accordance with a smaller form factor, performance may be compromised when using a correspondingly smaller antenna especially, when located in close proximity to the human body. Improvements in creative antenna design and manufacture are needed to accommodate smaller devices.

In previous wrist or body-worn devices, such as a smartwatch, an antenna array may be located solely within a puck portion (main or "watch" portion), or solely within a wristband portion, of a device. However, because of the close proximity of the antenna array to the wrist or body and the body's inherent ability to absorb radio signals, a maximum signal radiation range of such devices is limited (e.g., 1 to 2 meters). Moreover, because the previous wrist or body-worn devices do not allow for tuning of the antenna array, signal absorption by the human body cannot be mitigated, and therefore, the signal radiation range cannot be extended beyond the current limit (e.g., 1 to 2 meters). Accordingly, the present disclosure is directed to providing a structure and/or technique for improving/tuning an antenna array of a wrist or body-worn device in order to extend a maximum signal radiation range of the antenna array.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to methods, apparatus, and systems for mitigating signal attenuation on a body-worn device transmitting a signal. A system includes a body-worn device (e.g., radio frequency identification (RFID) tag) and a reading device (e.g., RFID reader). The body-worn device may include a circuit, an antenna array, and a conductive band capacitively coupled to the antenna array. The conductive band may be detachably coupled to a body of a user of the device. The body-worn device may operate without a battery or internal power source. As such, the body-worn device may receive energy from the reading device's transmission and use that same energy to send back a reply transmission. In an aspect, a construction of the conductive band (e.g., length, width, and/or thickness) may be tuned or adjusted to various sizes to improve radiation performance properties of the antenna array. Other aspects, embodiments, and features are also claimed and described.

In one example, an antenna structure for a body-worn device is disclosed. The antenna structure includes an antenna array configured to radiate at least one radio signal, and a conductive band capacitively coupled to the antenna array. The conductive band is configured to detachably couple to a body of a user and mitigate attenuation of the at least one radio signal when the conductive band is coupled to the body.

In another example, a method of mitigating signal attenuation on a body-worn device is disclosed. The method includes providing, in the body-worn device, an antenna array and a conductive band capacitively coupled to the antenna array, detachably coupling the conductive band to a body of a user, radiating at least one radio signal from the antenna array, and mitigating attenuation of the at least one radio signal via the conductive band when the conductive band is coupled to the body.

In a further example, a body-worn device for transmitting a radio signal is disclosed. The body-worn device includes an antenna array and a circuit configured to receive, via the antenna array, a first signal transmitted from a reading device, generate, based on an energy of the first signal, a second signal specific to the body-worn device, and transmit the second signal to the reading device via the antenna array. The body-worn device further includes a conductive band capacitively coupled to the antenna array, wherein the conductive band is configured to detachably couple to a body of a user, and mitigate attenuation of the second signal when the conductive band is coupled to the body.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements.

A human body presents a significant challenge to the transmissivity and reflection of radio signals. Due to the inherent amount of salt and water in the human body, a radio signal may be absorbed by the human body and unable to propagate to an intended destination. In order to achieve radio transmission or backscatter within a detectable range, aspects of the disclosure provide an apparatus and method for securely fastening a radio device onto the human body that supports and augments a radio operation.

In an aspect, an apparatus is provided that includes a metal spring band (e.g., steel spring band) which sits beneath a radio device that is capable of operating at different and discrete frequencies. The metal spring band is configured to shield the radio device from a human body on which the apparatus is worn. The metal spring band may be part of an overall antenna structure for the radio device. The metal spring band may or may not be coupled to the radio device to perform an antenna structure function. The radio device may be optimized by utilizing a width, length, and/or thickness of the metal spring band as a tunable variable. In addition, an overall size of the metal spring band may be optimized to improve shielding of the antenna structure from the human body.

In an aspect, although the spring band is described above as a metal spring band (e.g., steel spring band), the spring band is not limited to a metal material alone. It is contemplated that the spring band may be made of other materials, such as a conductive polymer, a metallic mesh, a metal-imbued ceramic, or any other material that can be worn on the human body while having radio frequency (RF) antenna functionality or characteristics.

Figure 1:
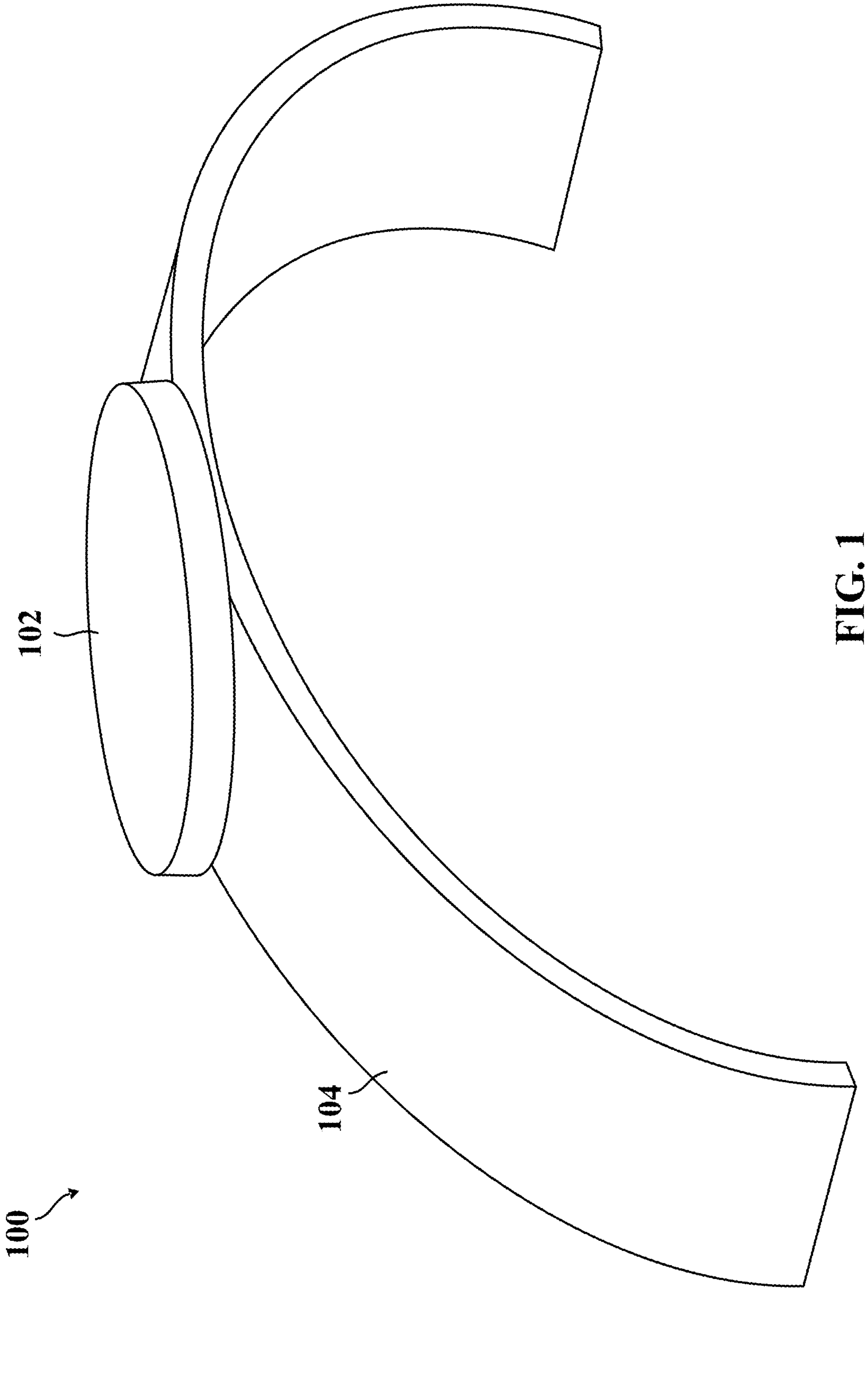
FIG. 1 illustrates a curved (or bent) configuration of an example antenna structure according to an aspect of the present disclosure.
Figure 2:
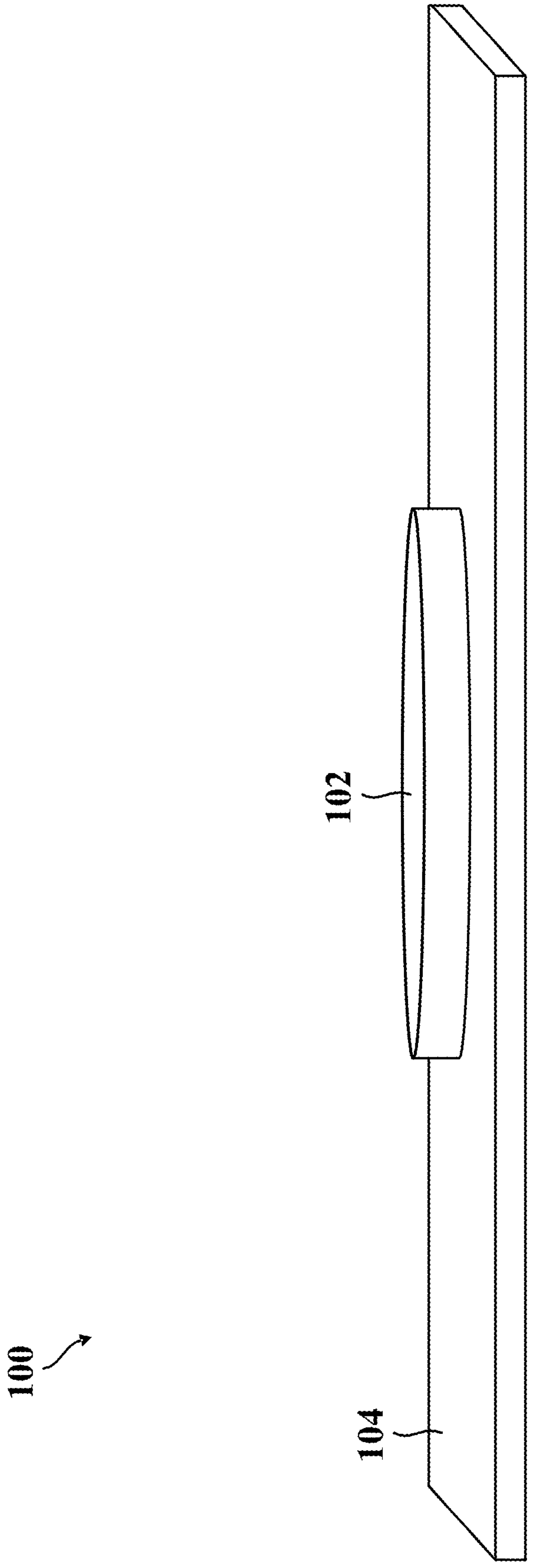
FIG. 2 illustrates a flat (or straight) configuration of the example antenna structure according to an aspect of the present disclosure.

FIG. 1 illustrates a curved (or bent) configuration of an example antenna structure 100 according to an aspect of the present disclosure. FIG. 2 illustrates a flat (or straight) configuration of the example antenna structure 100 according to an aspect of the present disclosure.

In an aspect, the antenna structure 100 includes an antenna 102 and a slap band 104 that may be electrically coupled to the antenna 102. The slap band 104 is made of a malleable material that will allow the slap band to maintain a desired configuration. For example, as shown in FIG. 1, the slap band 104 may be curved or bent from a flat configuration so as to wrap around a user's wrist or other body part. The slap band 104 may also revert back to the flat (or straight) configuration (FIG. 2) from the curved configuration, such as when the slap band 104 is removed from the user's wrist. Furthermore, the malleable material of the slap band 104 is conductive so as to electrically couple with the antenna 102. For example, the slap band 104 may be made of steel, conductive polymer, metallic mesh, metal-imbued ceramic, or any other conductive material.

The slap band 104 may be directly coupled or otherwise coupled to the antenna 102. In an aspect, the slap band 104 includes a ground plane structure wherein radio frequency (RF) current may flow in a conductive portion of the slap band 104 and around the user's wrist rather than being lost through the band and/or the user's wrist. One or more portions of the antenna 102 and the slap band 104 may or may not be electrically coupled together depending on a coupling mechanism used to join the slap band 104 with the antenna 102.

In an aspect, physical dimensions of the slap band 104 may be varied or tuned. For example, a length, width, and/or thickness of the slap band may be adjusted to various sizes in order to achieve desired performance characteristics at the antenna 102. Additionally and/or alternatively, the length, width, and/or thickness of the slap band 104 may be varied to hide or shield the effects of the human body on the performance of the antenna 102.

Figure 3:
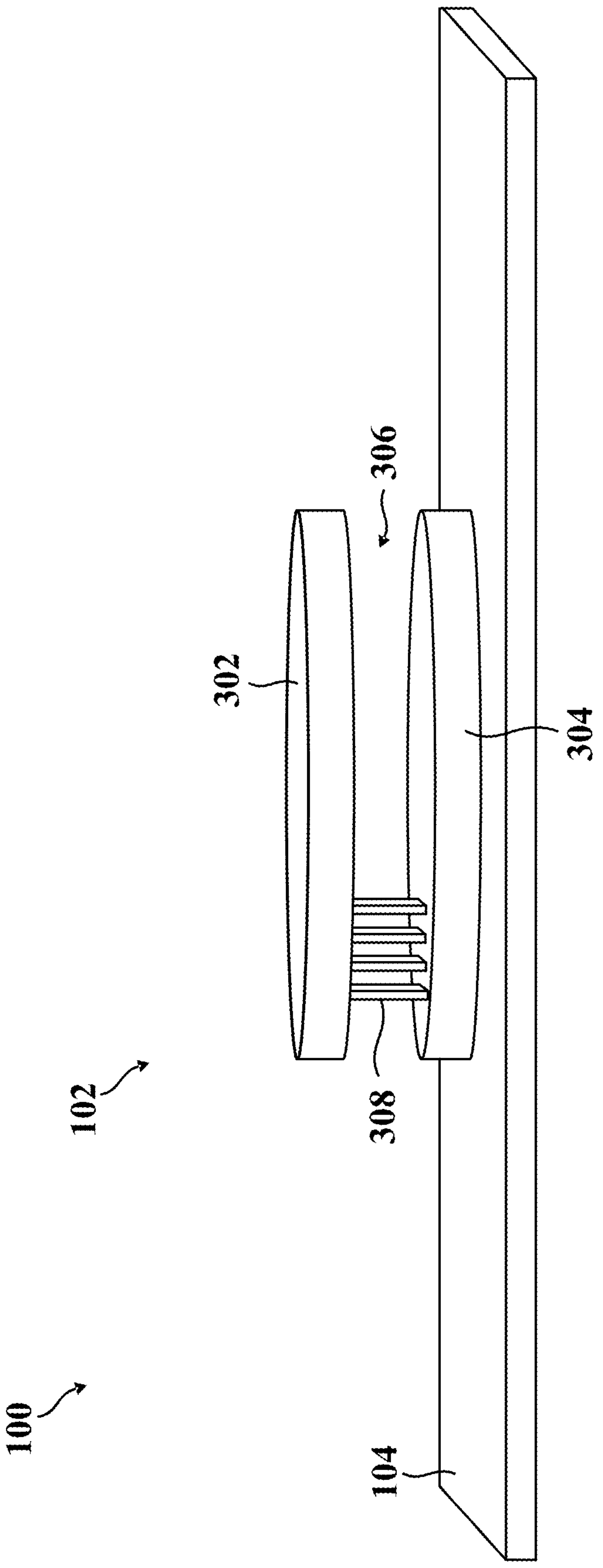
FIG. 3 illustrates the example antenna structure having an antenna with connectorized antenna elements according to an aspect of the present disclosure.
Figure 4:
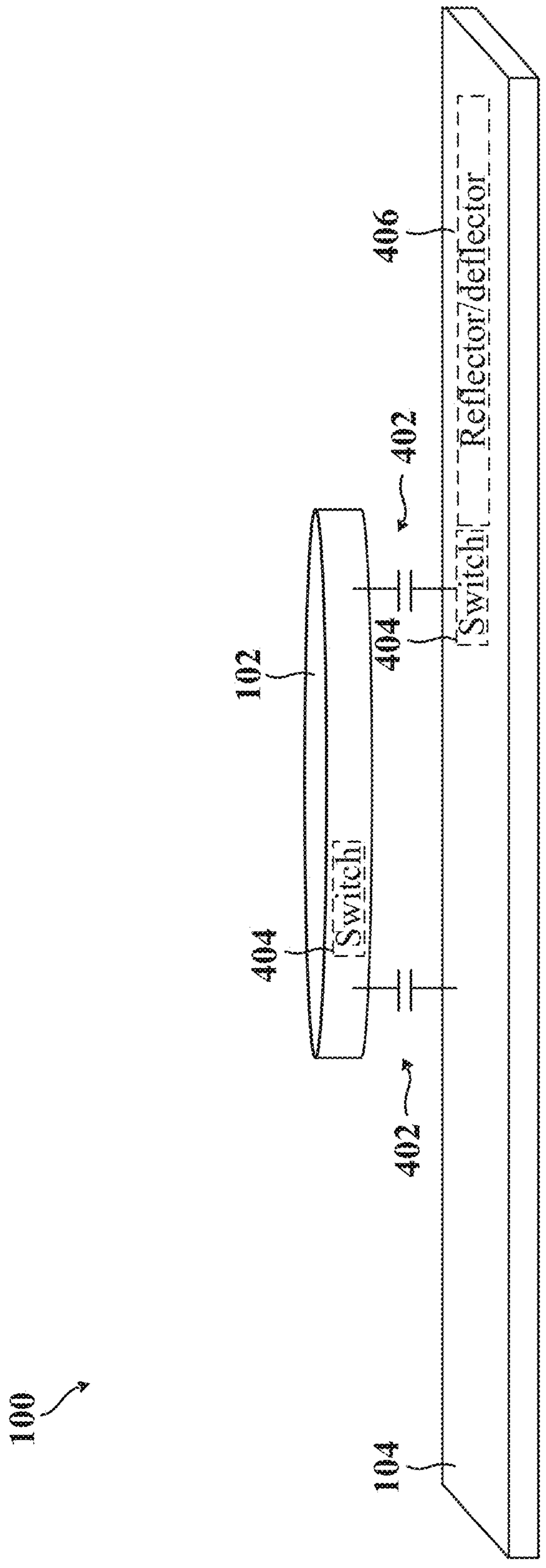
FIG. 4 illustrates the example antenna structure having an antenna coupled to a slap band via a capacitive coupling according to an aspect of the present disclosure.

FIG. 3 illustrates the example antenna structure 100 having an antenna 102 with connectorized antenna elements according to an aspect of the present disclosure. FIG. 4 illustrates the example antenna structure 100 having an antenna 102 coupled to a slap band 104 via one or more capacitive couplings 402 according to an aspect of the present disclosure.

In an aspect, the antenna 102 of the antenna structure 100 may be constructed on a slab of dielectric material, which aids in miniaturization of the antenna 102. In one aspect, air may be used as the dielectric material. As shown in FIG. 3, the antenna 102 may include a first antenna element (e.g., first printed circuit board (PCB)) 302, a second antenna element (e.g., second PCB) 304, and an air gap 306 between the first antenna element 302 and the second antenna element 304. The first antenna element 302 is connectorized to the second antenna element 304 (e.g., via one or more cables or wires 308) above the slap band 104 in order to achieve a necessary radiating structure. The slap band 104 may act as a ground plane. In some aspects, the antenna 102 may use other materials (e.g., ceramic) with differing dielectric properties to aid in antenna miniaturization.

In an aspect, the antenna structure 100 is different from previous types of body-worn devices (e.g., smartwatches). For example, in a previous type of body-worn device, an antenna structure is solely built into a main portion or body of the device itself. Thus, the smartwatch' s band does not affect an antenna structure function. In contrast, in the present disclosure, the slap band 104 is part of the antenna structure 100, and therefore, affects a function of the antenna structure 100. Whether the slap band 104 is electrically connected to or disparate from the antenna 102, a dielectric value of the slap band 104 is used in combination with the antenna 102 to affect/extend a signal radiation range of the antenna structure 100. In an aspect, a length, width, and/or thickness of the slap band 104 may be tuned to a specific size to achieve a desired radiation range. Previously, the antenna 102 may have had a maximum signal radiation range of 1 to 2 meters. However, by using the tuned slap band 104 as part of the antenna structure 100, a body-worn device implementing the antenna structure 100 may be able to achieve a maximum signal radiation range of 4 to 8 meters. Thus, use of the slap band 104 allows the antenna structure 100 to have an extended range while being worn on the body.

In an aspect, the antenna structure 100 may include directors or reflectors 406 that can be dynamically adjusted (or reconfigured) to shape a radiation pattern or other desired antenna characteristics of an antenna. For example, the slap band 104 may be considered a director/reflector that may be reconfigured to shape a radiation pattern or other characteristic of the antenna 102. Activating or deactivating a director/reflector with a switch 404 or other non-direct coupling mechanism may adjust RF characteristics of the antenna structure 100 as desired. The switch may be a physical semiconductor-based switch or may be some hardware element capable of altering a capacitive coupling of the slap band 104 to the antenna 102.

Figure 5:
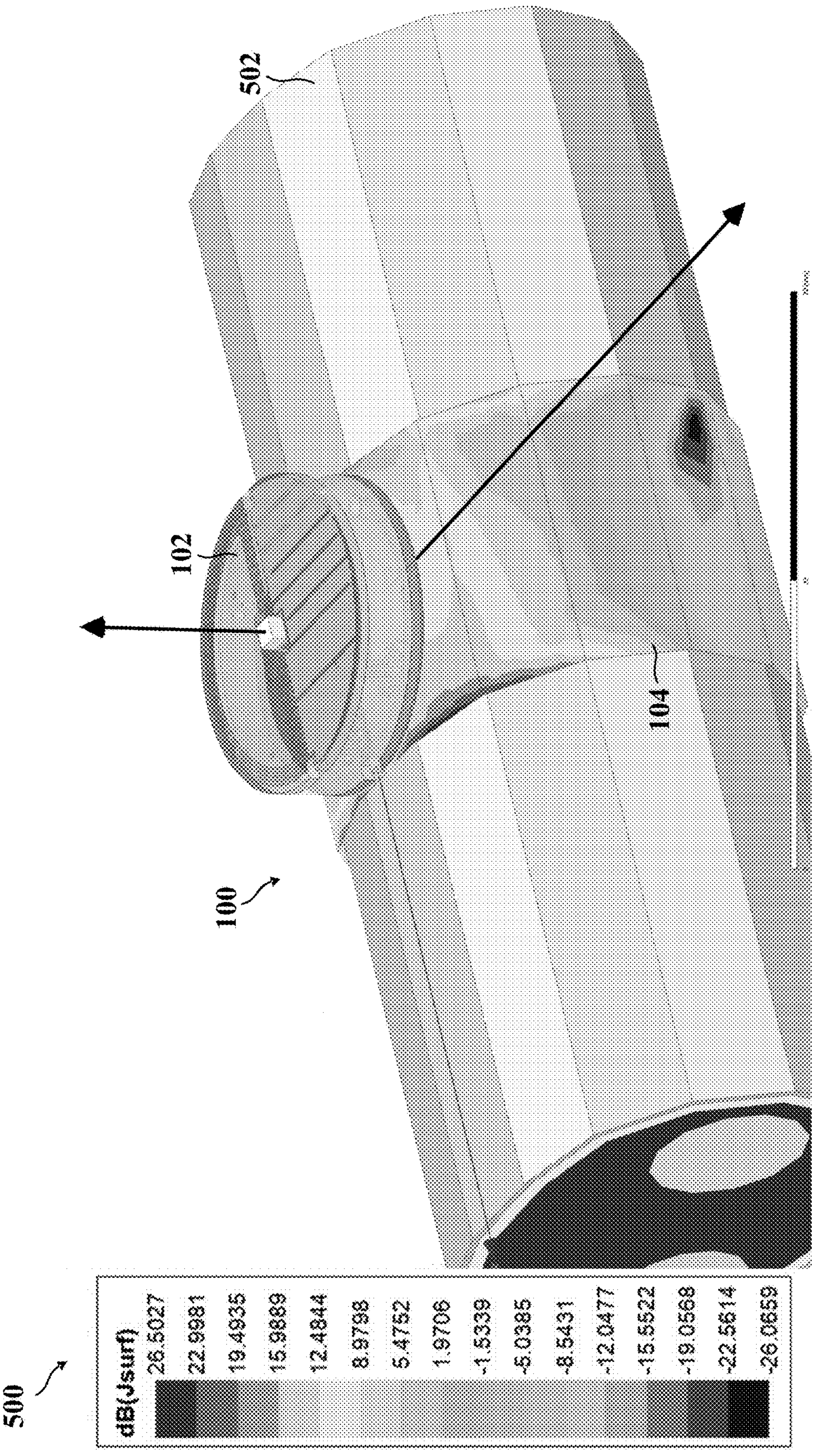
FIG. 5 is an example diagram of the antenna structure (including the antenna and the slap band) wrapped around a wrist (or other body part) of a user according to an aspect of the present disclosure.
Figure 6:
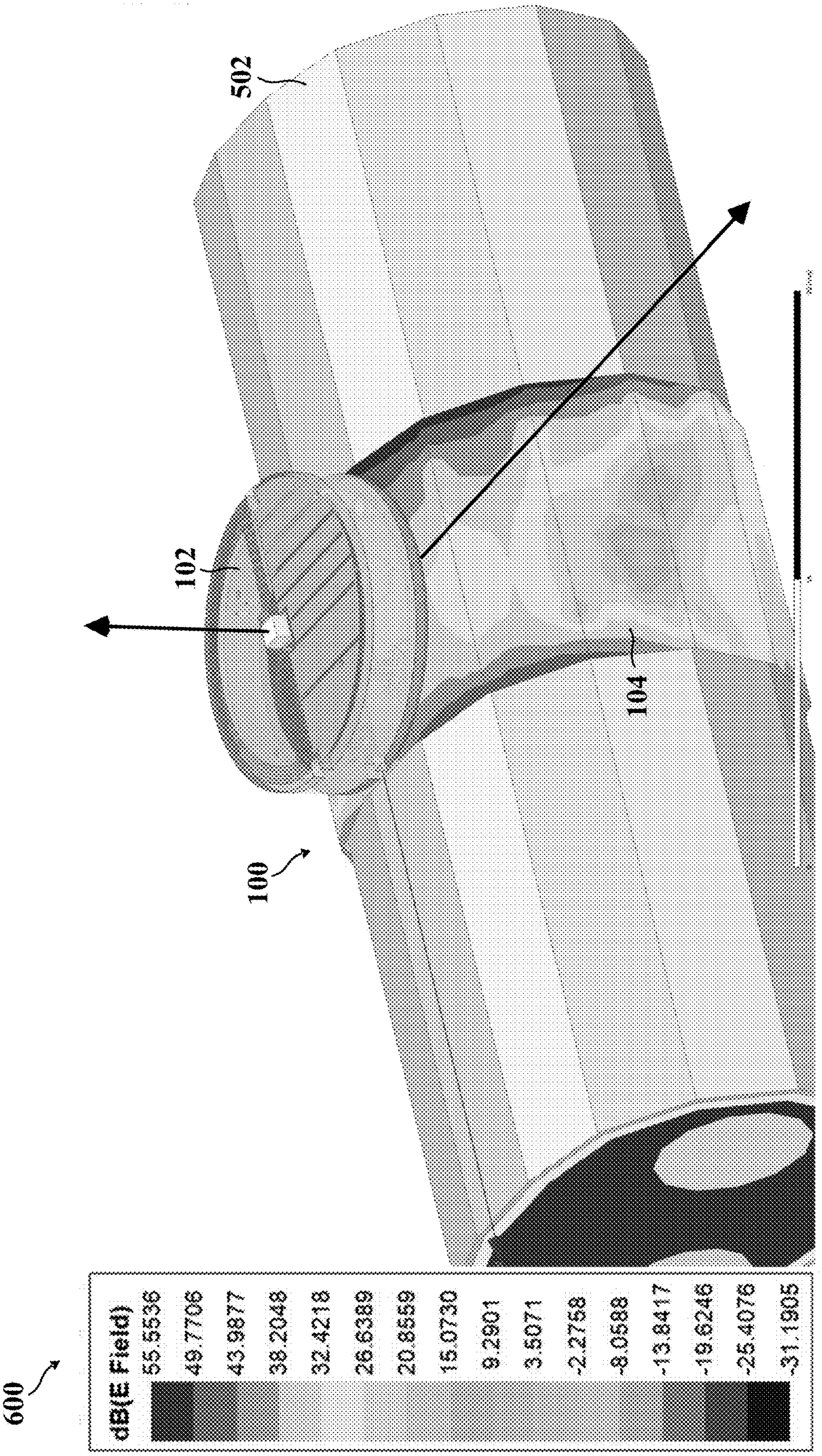
FIG. 6 is another example diagram of the antenna structure wrapped around the wrist (or other body part) of the user according to an aspect of the present disclosure.
Figure 7:
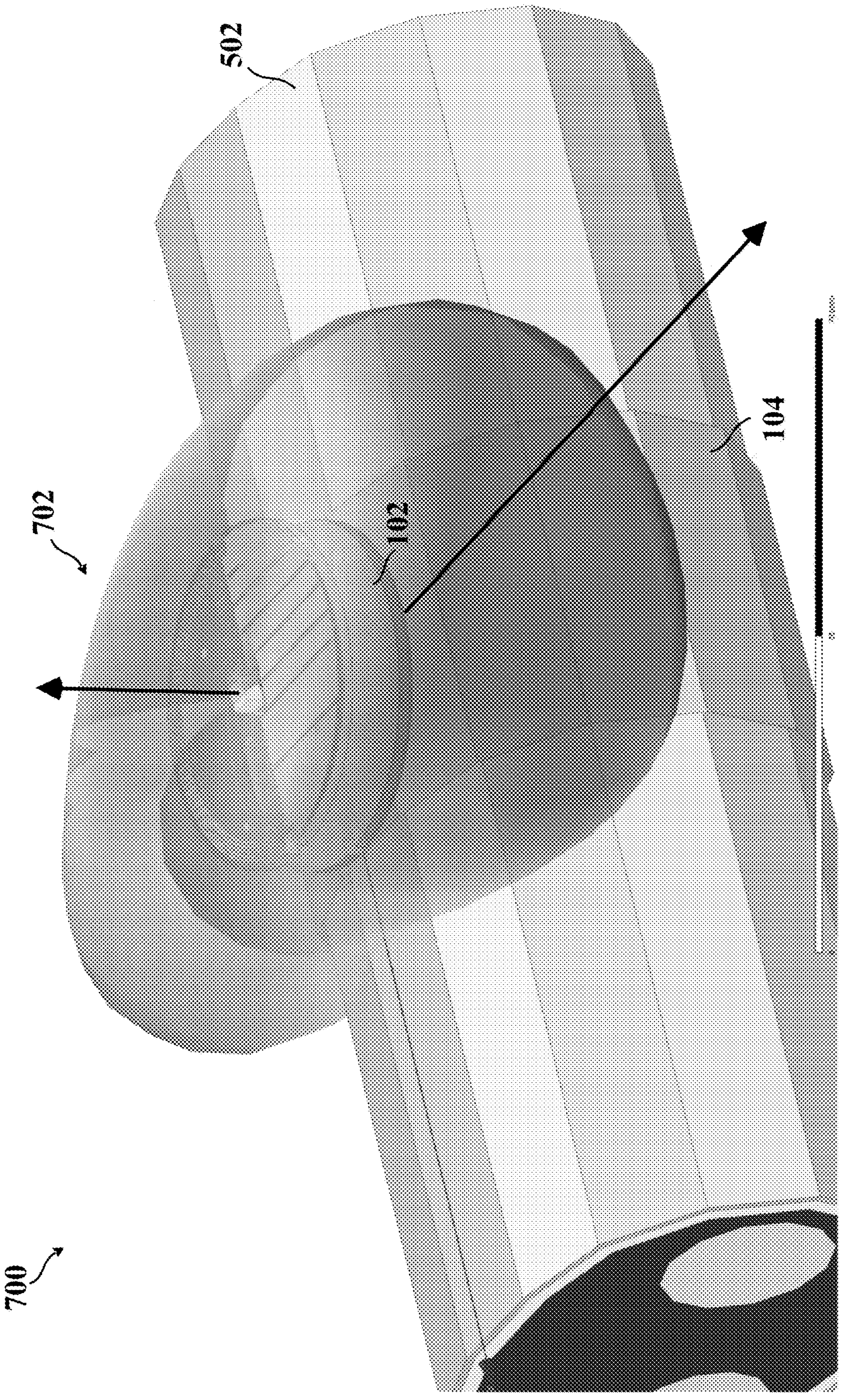
FIG. 7 is a diagram illustrating an example radiation pattern of the antenna according to an aspect of the present disclosure.

FIG. 5 is an example diagram 500 of the antenna structure 100 (including the antenna 102 and the slap band 104) wrapped around a wrist (or other body part) 502 of a user. In FIG. 5, a surface current in the slap band 104 is plotted to show how the slap band 104 is acting as part of a radiating structure of the antenna 102. FIG. 6 is another example diagram 600 of the antenna structure 100 wrapped around the wrist (or other body part) 502 of the user. In FIG. 6, an electric field in the slap band 104 is plotted to show how the slap band 104 is acting as part of the radiating structure of the antenna 102. FIG. 7 is a diagram 700 illustrating an example radiation pattern 702 of the antenna 102.

In an aspect, a performance of the antenna 102 may be hindered when in close proximity to the human body. As such, the slap band 104 (made of a conductive material) may be used to shield the antenna 102 from the negative effects of the human body. Moreover, the slap band 104 may be used as part of the radiating structure of the antenna 102 such that RF current may flow through the slap band 104. As such, the RF current may be directed to flow around the user's wrist/body instead of through the user, thus avoiding potential loss. Performance characteristics of the antenna 102 may be adjusted or improved by controlling a configuration of the slap band 104 in conjunction with modifications to the antenna 102.

In an aspect, various performance characteristics of the antenna 102 may be controlled based on a modification to the slap band 104 acting as a ground plane, or a modification to an armature associated with a ground plane of the antenna 102. The performance characteristics may include but are not limited to antenna size, frequency, gain, radiation pattern, radiation efficiency, aperture, and/or impedance. In some aspects, the performance characteristics may be controlled via a modification of the structure of the antenna 102, a modification of the structure of the slap band 104, or a combination of both. In an aspect, the performance of the antenna 102 when the slap band 104 is in the curved/bent configuration may be designed to be different from the performance of the antenna 102 when the slap band 104 is in the flat/straight configuration. For example, a radiation pattern of the antenna 102 may be adjusted as desired by shifting from a curved/bent band configuration to a flat/straight band configuration or vice versa, thus facilitating two different use cases at an end device.

In an aspect, the antenna structure 100 may include multiple antennas. The antennas may be active sequentially or simultaneously with one another. Moreover, the slap band 104 may be shared among the multiple antennas so that the slap band 104 may be used as part of a radiating structure of each antenna. In an aspect, the antenna structure 100 may include physical elements configured to adjust a position, size, and or polarization of an antenna in order to direct antenna signals in a more accurate and/or efficient manner. In one example of the antenna structure 100 including multiple antennas, the antenna structure may include a near-field communication (NFC) coil and an ultra-high frequency (UHF) antenna located in close proximity to one another. The NFC coil and UHF antenna may share the slap band 104 as part of their radiating structures so as to allow for the miniaturization of the co-located antennas (NFC coil and UHF antenna) in close physical proximity.

Figure 8:
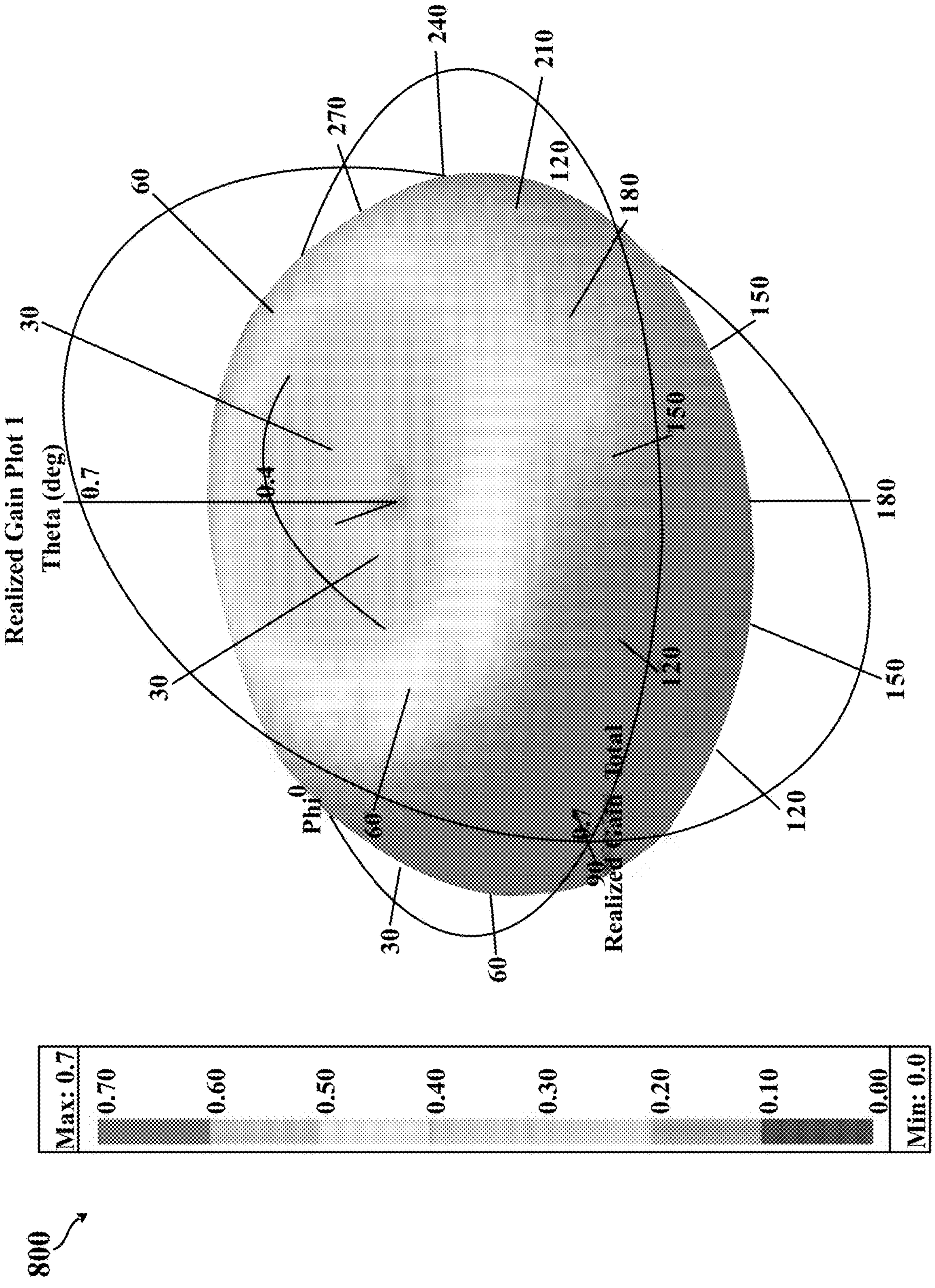
FIG. 8 is a plot of an example radiation pattern of an antenna with a slap band when simulated on a wrist of a user according to an aspect of the present disclosure.
Figure 9:
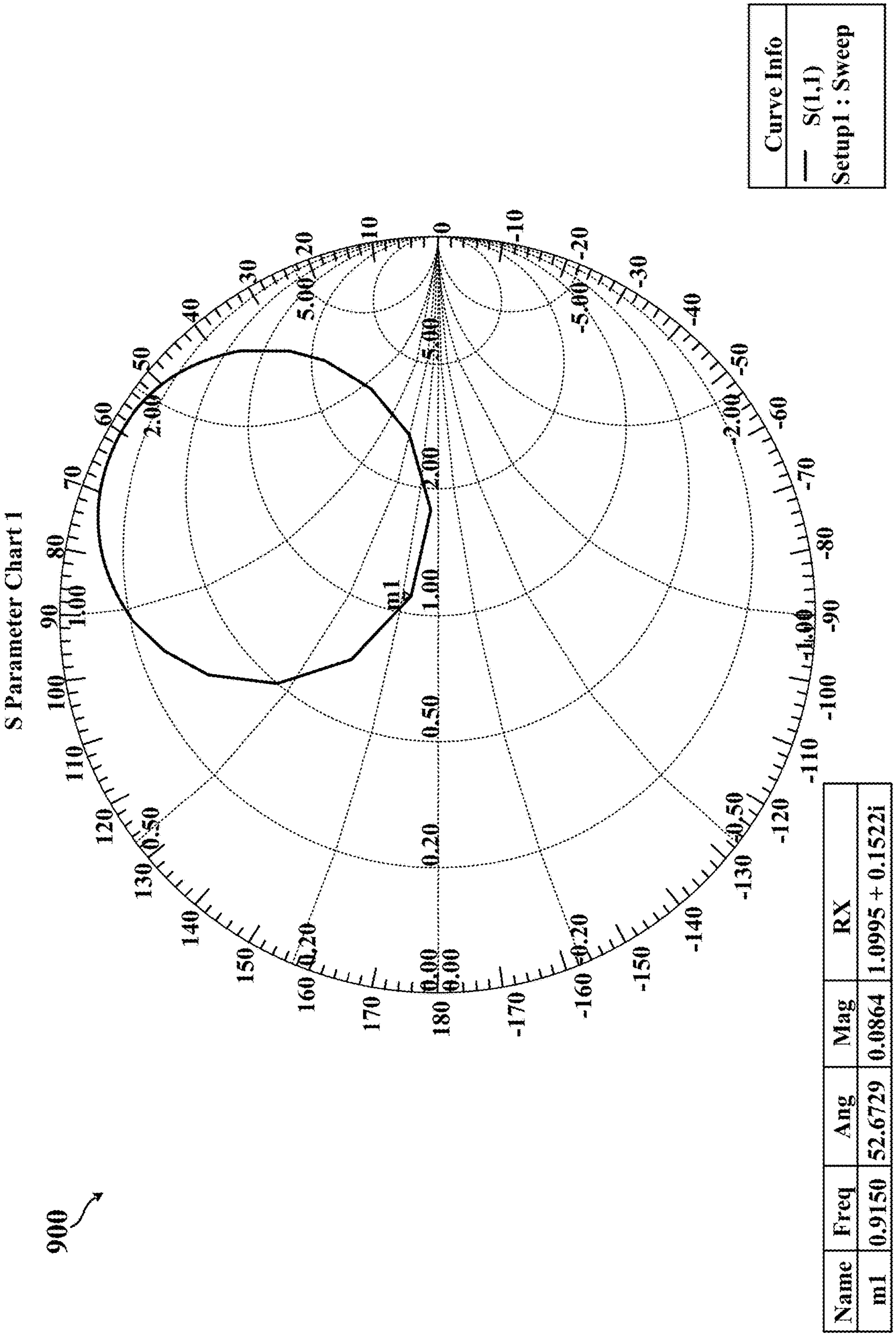
FIG. 9 is a Smith chart depicting an example S(1,1) performance of an antenna with a slap band when simulated on a wrist of a user according to an aspect of the present disclosure.
Figure 10:
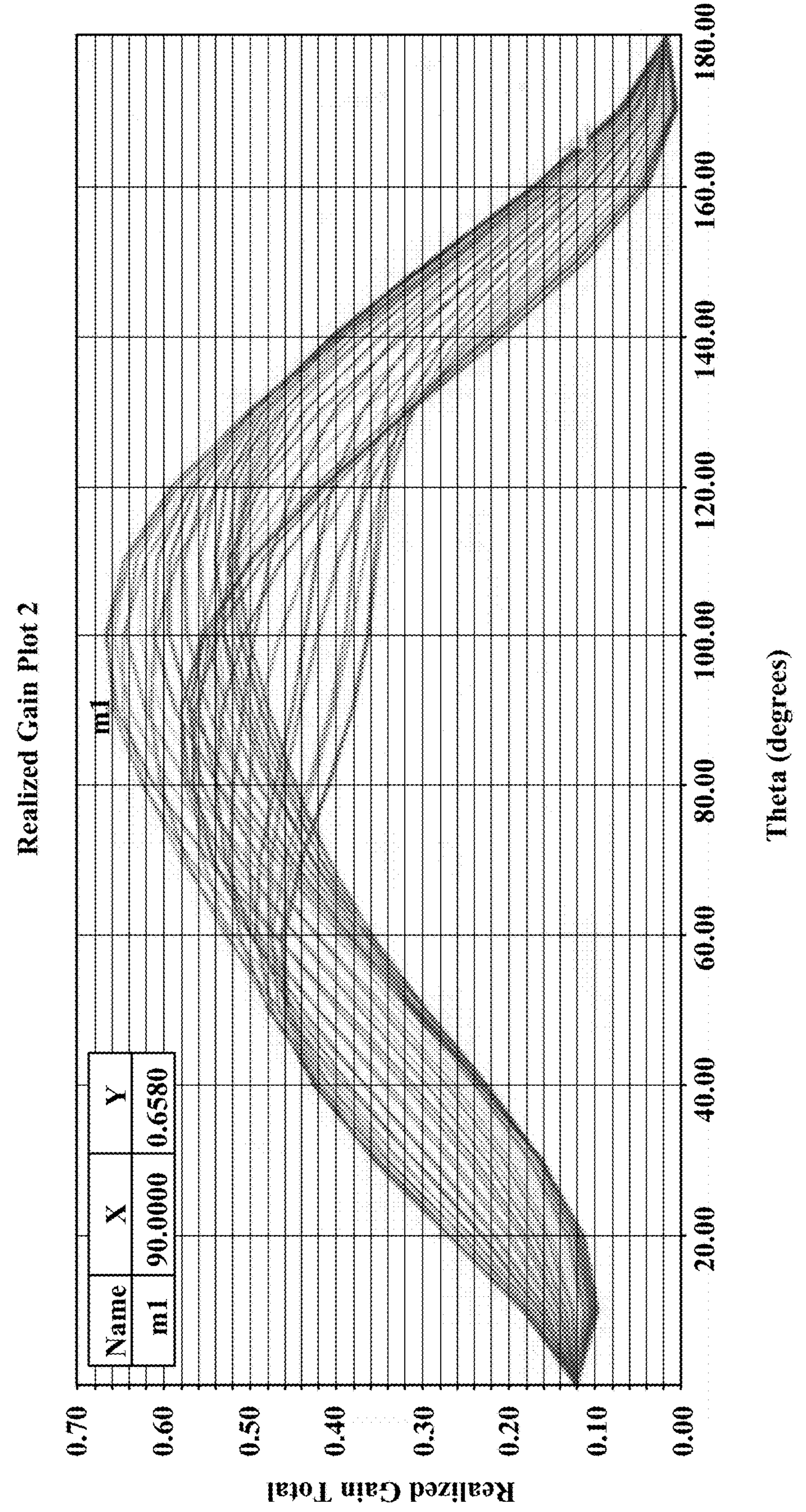
FIG. 10 is an example gain plot depicting gain versus frequency of an antenna structure according to an aspect of the present disclosure.

FIG. 8 is a plot 800 of an example radiation pattern of an antenna 102 with a slap band 104 when simulated on a wrist 502 of a user. FIG. 9 is a Smith chart 900 depicting an example S(1,1) performance of an antenna 102 with a slap band 104 when simulated on a wrist 502 of a user. FIG. 10 is an example gain plot 1000 depicting gain versus frequency (e.g., 0.915 GHz) of an antenna structure 100 for different angles theta (degrees).

In an aspect, the antenna structure 100 may include directors or reflectors that can be dynamically adjusted (or reconfigured) to shape a radiation pattern or other desired antenna characteristics of an antenna. For example, the slap band 104 may be considered a director/reflector that may be reconfigured to shape a radiation pattern or other characteristic of the antenna 102. Activating or deactivating a director/reflector with a switch or other non-direct coupling mechanism may adjust RF characteristics of the antenna structure 100 as desired. The switch may be a physical semiconductor-based switch or may be some hardware element capable of altering a capacitive coupling of the slap band 104 to the antenna 102.

Figure 11:
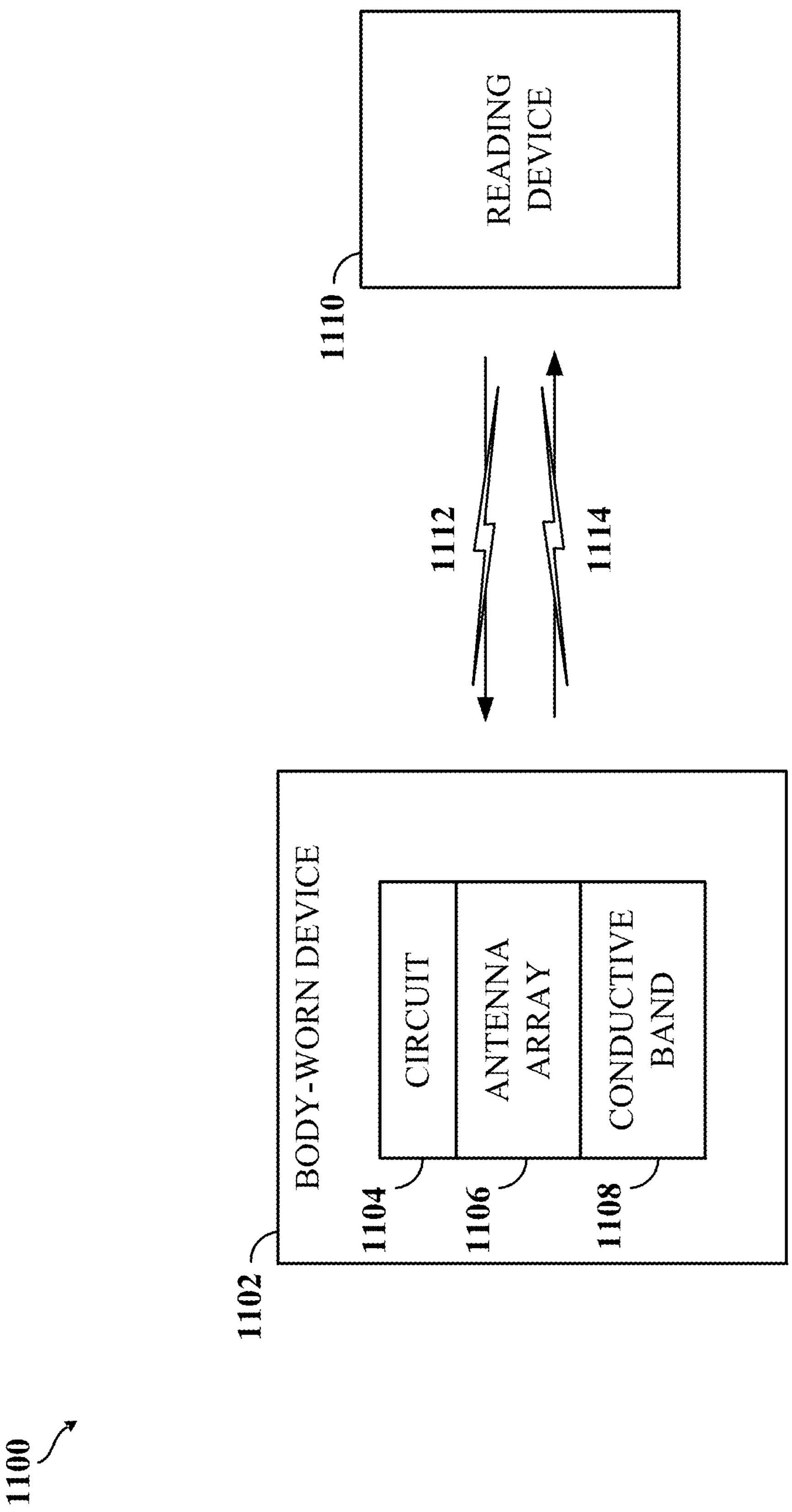
FIG. 11 is a block diagram illustrating an example system for communicating radio signals between devices according to an aspect of the present disclosure.

FIG. 11 is a block diagram illustrating an example system 1100 for communicating radio signals between devices according to an aspect of the present disclosure. The system 1100 includes a body-worn device 1102 (e.g., radio frequency identification (RFID) tag) and a reading device 1110 (e.g., RFID reader). The body-worn device 1102 may include a circuit 1104, an antenna array 1106, and a conductive band 1108 capacitively coupled to the antenna array 1106. The conductive band 1108 may be detachably coupled to a body of a user of the device 1102. Moreover, a combination of the antenna array 1106 and the conductive band 1108 may be referred to as the "antenna structure" mentioned throughout this disclosure.

In an aspect, the body-worn device 1102 may operate without a battery or internal power source. As such, the body-worn device 1102 may receive energy from the reading device's transmission 1112 and use that same energy to send back a reply transmission 1114. For example, the body-worn device 1102 receives, via the antenna array 1106, electromagnetic waves 1112 propagated from the reading device 1110. Once the waves 1112 reach the antenna array 1106, energy of the waves 1112 travels through the antenna array 1106 to activate the circuit 1104. The circuit 1104 modulates the energy with information specific to the body-worn device 1102 (e.g., modulated with the circuit's data) to generate the reply transmission 1114. The circuit 1104 then transmits the reply transmission 1114 (modulated with the information specific to the body-worn device 1102/circuit 1104) to the reading device 1110 via the antenna array 1106 in the form of electromagnetic waves.

The reading device 1110 may receive the reply transmission 1114, read the information specific to the body-worn device 1102/circuit 1104, and perform an operation corresponding to the body-worn device 1102 based on the information. For example, the reading device 1110 may account for the presence of the user wearing the body-worn device 1102 within a vicinity of the reading device 1110 and/or grant the user wearing the body-worn device 1102 predetermined services corresponding to the information (e.g., within a theme park environment).

In an aspect, the conductive band 1108 may mitigate attenuation of the reply transmission 1114 when the conductive band 1108 is coupled to the body of the user. For example, when the circuit 1104 transmits the reply transmission 1114 to the reading device 1110 via the antenna array 1106, the conductive band 1108 may facilitate a radio frequency (RF) signal current corresponding to the reply transmission 1114 to flow through the conductive band 1108 and prevent absorption of the RF signal current by the body.

Previous body-worn devices (e.g., previous wristband tags/systems) may suffer from a limited signal radiation range because of the human body's ability to absorb certain signal frequencies (e.g., 900 MHz). Typically, a maximum range for such devices is approximately 1 to 2 meters. Accordingly, for certain applications, such as applications implemented during large gatherings (e.g., music festivals, sporting events, etc.), use of the previous body-worn devices may be cumbersome. For example, due to the limited signal radiation range of a device caused by the proximity of a user's wrist to an antenna structure (i.e., the user's wrist attenuates most of the device signal emitted from the antenna structure), it may be necessary to erect reading portals near the user in order to read a short range transmission from the user's device.

Aspects of the present disclosure provide a system and/or method for enabling a reading device (e.g., RFID reader) to read signals from a body-worn device as far as 4 to 8 meters away. As such, a distance at which the body-worn device can be read by the reading device may be defined. In an aspect, the present disclosure provides a body-worn device configured to mitigate signal attenuation caused by the body (e.g., wrist) of the user. In a further aspect, antenna structure properties may be tuned to define a maximum distance at which a reading device can detect signals from the antenna structure of the body-worn device, while allowing a form factor of the body-worn device to fit most users. Thus, not only does the body-worn device of the present disclosure function to have a tunable antenna parameter to achieve a desired signal range, but the body-worn device also conforms to a size/shape of the user.

Figure 12:
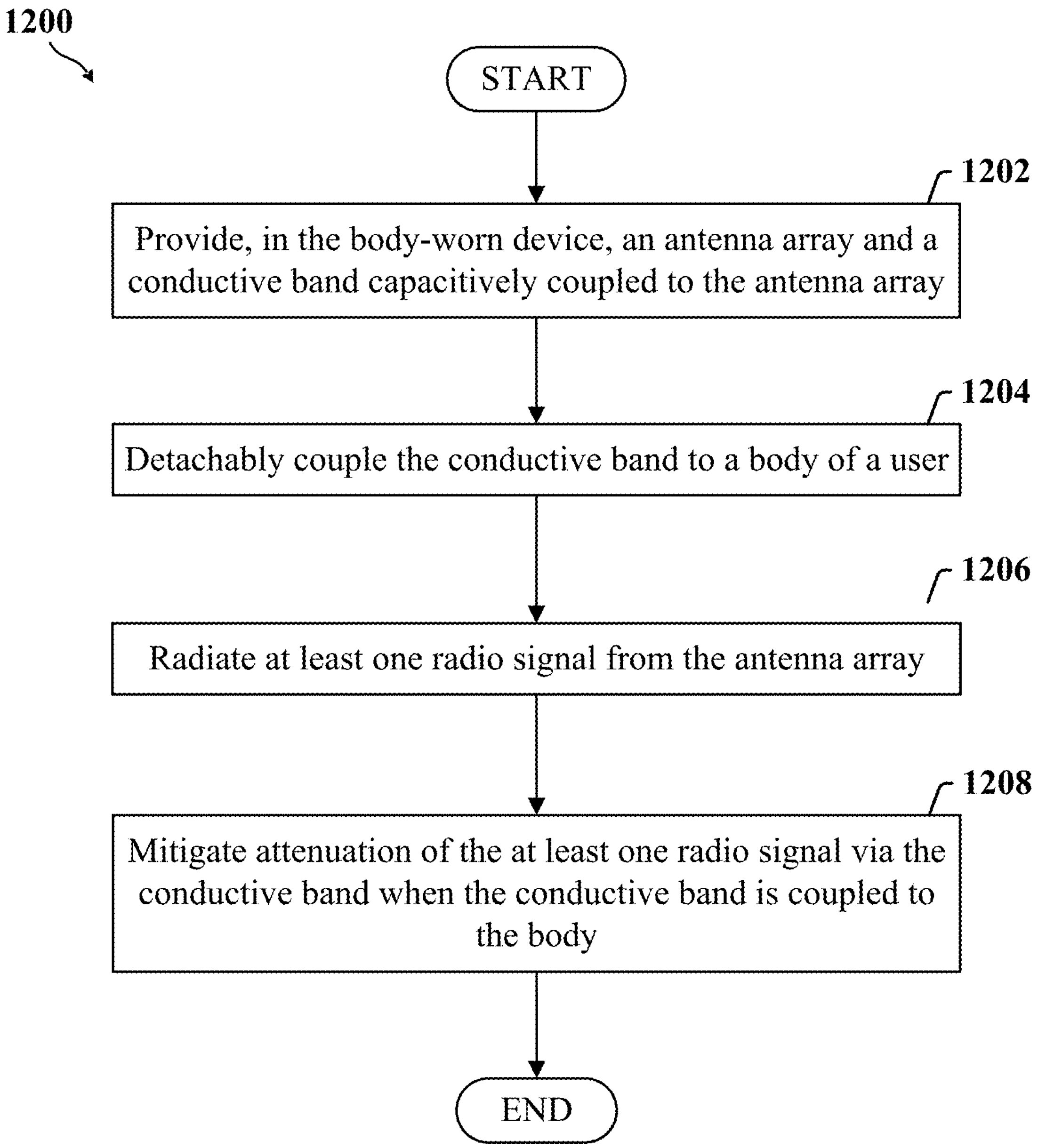
FIG. 12 is a flow chart illustrating an exemplary process for mitigating signal attenuation on a body-worn device according to an aspect of the present disclosure

FIG. 12 is a flow chart illustrating an exemplary process 1200 for mitigating signal attenuation on a body-worn device according to an aspect of the present disclosure. In some examples, the process 1200 may be carried out by the body-worn device 1102 or any suitable apparatus or means for carrying out the functions or algorithm described below.

At 1202, an antenna array (e.g., antenna 102 or antenna array 1106) and a conductive band (e.g., slap band 104 or conductive band 1108) capacitively coupled to the antenna array is provided in the body-worn device. In an aspect, the conductive band may be made of steel, conductive polymer, metallic mesh, and/or metal-imbued ceramic.

In an aspect, providing the conductive band in the body-worn device may include configuring a length, a width, and/or a thickness of the conductive band to optimize one or more performance characteristics of the antenna array. For example, optimizing a performance characteristic may include extending a maximum signal radiation range of the antenna array (e.g., to a range of 4 to 8 meters), such that a reading device will be able to read a transmission from the body-worn device from such range. In another aspect, providing the conductive band in the body-worn device may include configuring a length, a width, and/or a thickness of the conductive band to shield an absorption effect of the body on at least one radio signal radiated from the antenna array.

At 1204, the conductive band is detachably coupled to a body of a user. In an aspect, the conductive band is detachably coupled to the body of the user by flattening the conductive band to a substantially straight configuration to uncouple the conductive band from the body and bending the conductive band to a curved configuration to couple the conductive band to the body. In an aspect, a performance characteristic of the antenna array (e.g., radiation pattern) when the conductive band is in the straight configuration may be different from a performance characteristic of the antenna array when the conductive band is in the curved configuration.

At 1206, at least one radio signal (e.g., reply transmission 1114) is radiated from the antenna array. In an aspect, the at least one radio signal has a frequency in an ultra-high frequency (UHF) range (e.g., approximately 900 MHz), or any other frequency susceptible to being absorbed by the body.

At 1208, attenuation of the at least one radio signal is mitigated via the conductive band when the conductive band is coupled to the body. In an aspect, the attenuation is mitigated by facilitating a radio frequency (RF) signal current corresponding to the at least one radio signal to flow through the conductive band, and preventing absorption of the RF signal current by the body.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

What is claimed is:

1. An antenna structure for a body-worn device, the antenna structure comprising:
- one or more antennas configured to radiate at least one radio signal;
- a conductive band capacitively coupled to the one or more antennas and that comprises a director or reflector for the one or more antennas, wherein the conductive band is configured to:
  - detachably couple to a body of a user; and
  - backscatter the at least one radio signal when the conductive band is coupled to the body; and
- a switch to toggle activation of the director or reflector,
- wherein structures of the one or more antennas and the conductive band are tuned to each other according to one or more performance characteristics of the antenna structure,
- wherein the structure of the conductive band comprises a length, a width, and a thickness of the conductive band, and
- wherein tuning the structure of the conductive band according to the one or more performance characteristics comprises tuning at least the length, the width, or the thickness of the conductive band to shield an absorption effect of the body on the at least one radio signal radiated from the one or more antennas.

2. The antenna structure of claim 1, wherein the conductive band configured to backscatter the at least one radio signal is configured to:
- facilitate a radio frequency (RF) signal current corresponding to the at least one radio signal to flow through the conductive band; and
- prevent absorption of the RF signal current by the body.

3. The antenna structure of claim 1, wherein the conductive band comprises at least one of:
- steel;
- conductive polymer;
- metallic mesh; or metal-imbued ceramic.

4. The antenna structure of claim 1, wherein the conductive band is configured to be flattened to a straight configuration when uncoupled from the body and bent to a curved configuration when coupled to the body.

5. The antenna structure of claim 4, wherein at least one performance characteristic of the one or more performance characteristics of the antenna structure when the conductive band is in the straight configuration is different from the at least one performance characteristic of the antenna structure when the conductive band is in the curved configuration.

6. The antenna structure of claim 1, wherein the one or more performance characteristics comprise extending a maximum signal radiation range of the one or more antennas, a size of the one or more antennas, a frequency of operation, a radiation pattern, radiation efficiency, an aperture, or an impedance.

7. The antenna structure of claim 1, wherein the switch is configured to alter a capacitive coupling of the conductive band to the one or more antennas.

8. The antenna structure of claim 1, wherein the one or more antennas comprises:
- a first antenna of a first type; and
- a second antenna of a second type, wherein the first antenna and the second antenna share the conductive band as part of their radiating structures.

9. The antenna structure of claim 8, wherein the first type comprises a near-field communication (NFC) coil, and the second type comprises an ultra-high frequency (UHF) antenna.

10. A method of mitigating signal attenuation on a body-worn device, the method comprising:
- providing, in the body-worn device:
  - one or more antennas; and
  - a conductive band capacitively coupled to the one or more antennas;
- detachably coupling the conductive band to a body of a user;
- radiating at least one radio signal from the one or more antennas;
- backscattering the at least one radio signal via the conductive band when the conductive band is coupled to the body; and
- mitigating attenuation of the at least one radio signal via the conductive band when the conductive band is coupled to the body; and activating a director or reflector of the conductive band for the one or more antennas based on toggling of a switch of the body-worn device, wherein providing the conductive band in the body-worn device comprises tuning structures of the one or more antennas and the conductive band to each other according to one or more performance characteristics, the structure of the conductive band comprises a length, a width, and a thickness of the conductive band, and tuning the structure of the conductive band according to the one or more performance characteristics comprises tuning at least one of the length, the width, or the thickness of the conductive band to shield an absorption effect of the body on the at least one radio signal radiated from the one or more antennas.

11. The method of claim 10, wherein backscattering the at least one radio signal comprises:

facilitating a radio frequency (RF) signal current corresponding to the at least one radio signal to flow through the conductive band; and preventing absorption of the RF signal current by the body.

12. The method of claim 10, wherein detachably coupling the conductive band to the body of the user comprises:

flattening the conductive band to a straight configuration when the conductive band is uncoupled from the body; and bending the conductive band to a curved configuration when the conductive band is coupled to the body.

13. The method of claim 10, wherein the one or more performance characteristics comprise extending a maximum signal radiation range of the one or more antennas, a size of the one or more antennas, a frequency of operation, a radiation pattern, radiation efficiency, an aperture, or an impedance.

14. The method of claim 10, wherein providing the antenna array one or more antennas comprises:

providing a first antenna of a first type in the antenna array one or more antennas; and providing a second antenna of a second type in the antenna array one or more antennas, wherein the first antenna and the second antenna share the conductive band as part of their radiating structures.

15. A body-worn device for transmitting a radio signal, the body-worn device comprising:

one or more antennas;

a circuit configured to:

receive, via the one or more antennas, a first signal transmitted from a reading device, generate, based on an energy of the first signal, a second signal specific to the body-worn device, and transmit the second signal to the reading device via the one or more antennas; and a conductive band capacitively coupled to the antenna array one or more antennas, wherein the conductive band is configured to:

detachably couple to a body of a user, mitigate attenuation of the second signal when the conductive band is coupled to the body, and activate a director or reflector of the conductive band for the one or more antennas based on toggling of a switch of the body-worn device, wherein structures of the one or more antennas and the conductive band are tuned to each other according to one or more performance characteristics of the one or more antennas, the structure of the conductive band comprises a length, a width, and a thickness of the conductive band, and tuning the structure of the conductive band according to the one or more performance characteristics comprises tuning at least one of the length, the width, or the thickness of the conductive band to shield an absorption effect of the body on the second signal.

16. The body-worn device of claim 15, wherein the conductive band configured to mitigate the attenuation is configured to:

facilitate a radio frequency (RF) signal current corresponding to the second signal to flow through the conductive band; and prevent absorption of the RF signal current by the body.

17. An antenna structure for a body-worn device, the antenna structure comprising:

an antenna array configured to radiate at least one radio signal;

a conductive band capacitively coupled to the antenna array, wherein the conductive band is configured to:

detachably couple to a body of a user, and backscatter the at least one radio signal when the conductive band is coupled to the body; and a switch configured to toggle activation of a director or reflector of the conductive band for the antenna array, wherein structures of the antenna array and the conductive band are tuned to each other according to one or more performance characteristics of the antenna structure, the structure of the conductive band comprises a length, a width, and a thickness of the conductive band, and tuning the structure of the conductive band according to the one or more performance characteristics comprises tuning at least one of the length, the width, or the thickness of the conductive band to shield an absorption effect of the body on the at least one radio signal radiated from the antenna array.

* * * * *